United States Patent
Mantell et al.

(10) Patent No.: US 7,422,299 B2
(45) Date of Patent: Sep. 9, 2008

(54) COMPENSATION FOR MALFUNCTIONING JETS

(75) Inventors: David A. Mantell, Rochester, NY (US); Stephen M. Kroon, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 590 days.

(21) Appl. No.: 11/155,227

(22) Filed: Jun. 16, 2005

(65) Prior Publication Data

US 2006/0285131 A1 Dec. 21, 2006

(51) Int. Cl.
*B41J 29/38* (2006.01)
(52) U.S. Cl. .......................... 347/14; 347/19; 358/1.14
(58) Field of Classification Search .................. 347/5, 347/9, 12, 14, 19, 40–44; 358/1.14, 1.5, 358/1.7, 1.8, 504
See application file for complete search history.

(56) References Cited

U.S. PATENT DOCUMENTS 6,215,557 B1 * 4/2001 Owens ..................... 358/1.14

2005/0105105 A1 5/2005 Vestjens et al. ............... 358/1.8

FOREIGN PATENT DOCUMENTS

JP 2004145732 * 5/2003

* cited by examiner

*Primary Examiner*—Juanita D Stephens
(74) *Attorney, Agent, or Firm*—Fay Sharpe LLP (57) ABSTRACT

A method of modifying a single color bi level bitmap including selecting a marked pixel, determining whether the selected marked pixel is in a half-toned uniform region, marking a first unmarked pixel of a first sequence of potential destination pixel locations if the selected marked pixel is in a half-toned uniform region, marking a first unmarked pixel of a second sequence of potential destination pixel locations if the selected marked pixel is not in a half-toned uniform region, and wherein the second sequence of potential destination pixel locations is different from the first sequence of potential destination pixel locations.

27 Claims, 5 Drawing Sheets

|   |   |   |   |   |   |
|---|---|---|---|---|---|
| PD(9) | PD(3) |   | PD(2) | PD(8) | PD(13) |
| PD(7) | PD(1) | S | PD(0) | PD(6) | PD(12) |
| PD(11) | PD(5) |   | PD(4) | PD(10) | PD(14) |

FIG. 6

|   |   |   |
|---|---|---|
| PD(5) |   | PD(4) |
| PD(1) | S | PD(0) |
| PD(3) |   | PD(2) |

FIG. 7

|   |   |   |
|---|---|---|
| PD(4) |   | PD(5) |
| PD(0) | S | PD(1) |
| PD(2) |   | PD(3) |

FIG. 8

COMPENSATION FOR MALFUNCTIONING JETS

BACKGROUND

The subject disclosure is generally directed to digital printing.

Drop on demand ink jet technology for producing printed media has been employed in commercial products such as printers, plotters, and facsimile machines. Generally, an ink jet image is formed by selective placement on a receiver surface of ink drops emitted by a plurality of drop generators implemented in a printhead or a printhead assembly. For example, the printhead assembly and the receiver surface are caused to move relative to each other, and drop generators are controlled to emit drops at appropriate times, for example by an appropriate controller. The receiver surface can be a transfer surface or a print medium such as paper. In the case of a transfer surface, the image printed thereon is subsequently transferred to an output print medium such as paper. Some ink jet printheads employ melted solid ink.

It can be difficult to compensate for inoperative, intermittent, malfunctioning or misdirected drop generators.

DETAILED DESCRIPTION

Figure 1:
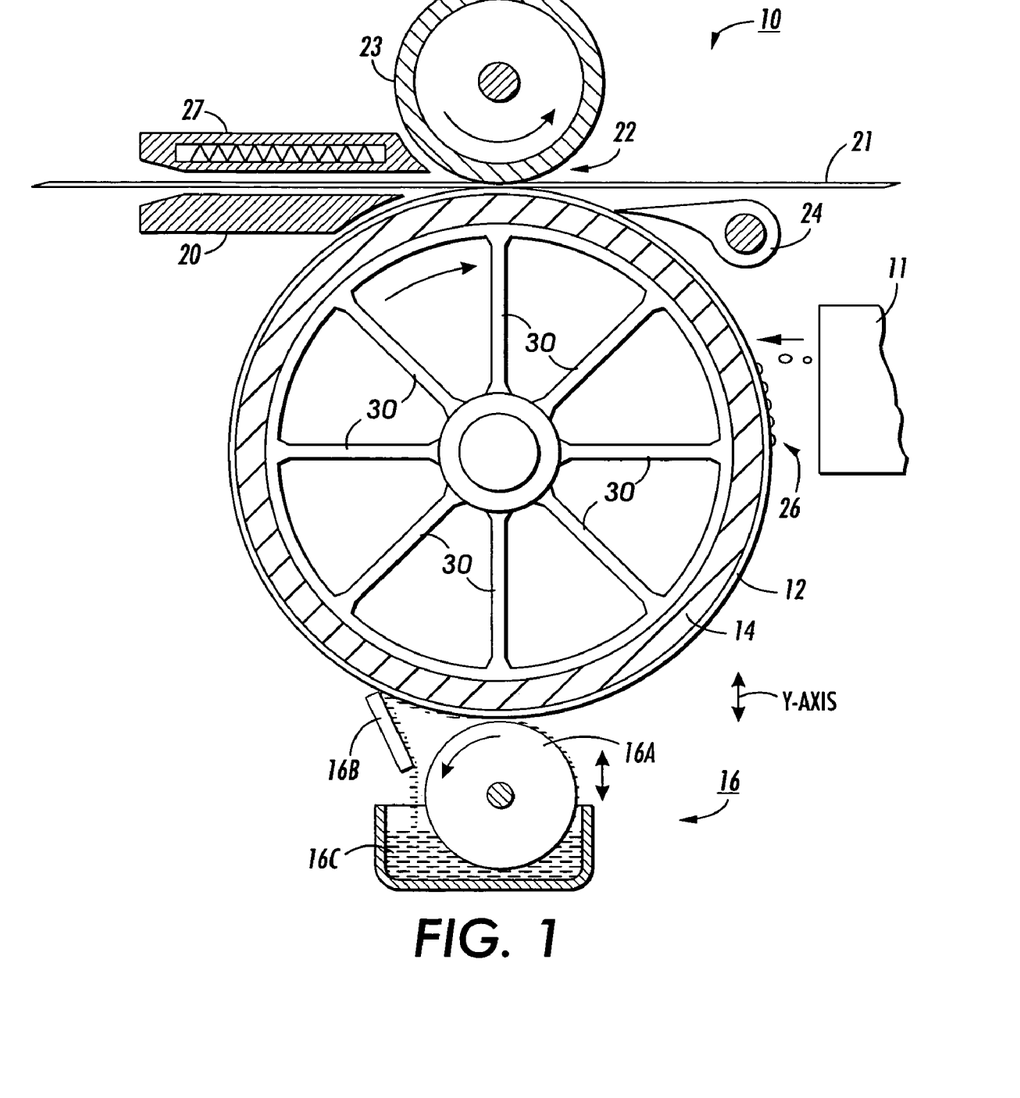
FIG. 1 is a schematic block diagram of an embodiment of a printing apparatus

FIG. 1 is a schematic block diagram of an embodiment of a printing apparatus 10 in which the disclosed techniques can be employed. The printing apparatus includes a printhead 11 that is appropriately supported for moving utilization to emit drops 26 of ink onto an intermediate transfer surface 12 applied to a supporting surface of a print drum 14 that is rotatable about an axis of rotation that is parallel to an X-axis (FIG. 2) that is orthogonal to the plane of FIG. 1. The ink can be melted solid or phase change ink, for example, and the print drum 14 can be heated. The intermediate transfer surface 12 can be a liquid layer such as a functional oil that can be applied by contact with an applicator such as a roller 16A of an applicator assembly 16. By way of illustrative example, the applicator assembly 16 can include a housing 16C that supports the roller 16A and a metering blade 16B. The housing 16C can function as a reservoir for containing the liquid that is removed from the print drum by the metering blade. The applicator assembly 16 can be configured for selective engagement with the print drum 14.

The printing apparatus 10 further includes a substrate guide 20 and a media preheater 27 that guides a print media substrate 21, such as paper, through a nip 22 formed between opposing acutated surfaces of a transfer roller 23 and the intermediate transfer surface 12 supported by the print drum 14. The transfer roller is selectively movable into contact with the intermediate transfer surface 12. Stripper fingers 24 can be pivotally mounted to assist in removing the print medium substrate 21 from the intermediate transfer surface 12 after an image 26 comprising deposited ink drops is transferred to the print medium substrate 21.

Figure 2:
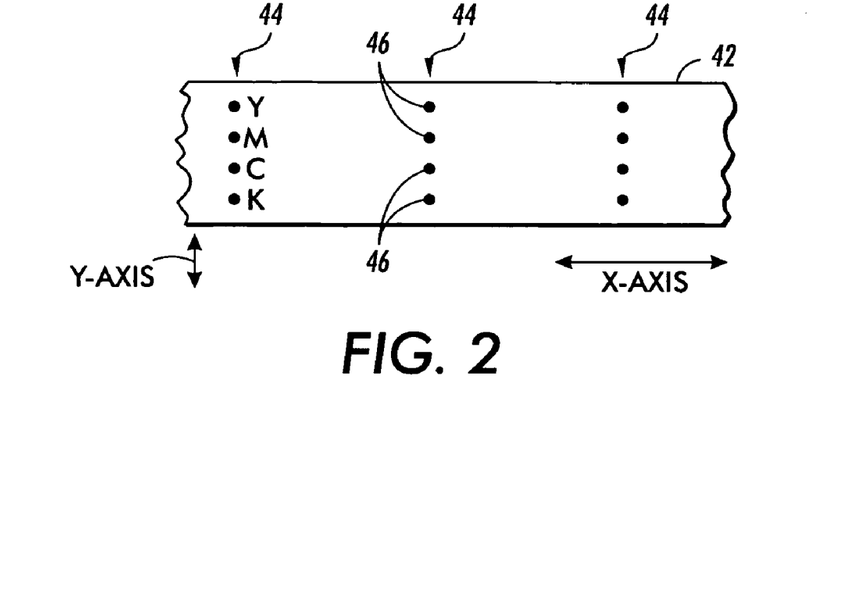
FIG. 2 is a schematic view of a portion of an embodiment of a face of an ink jet printhead of the printing of FIG. 1.

FIG. 2 schematically depicts an embodiment of a portion of a face of a printhead 11 having substantially mutually parallel columnar arrays 44 of nozzles 46. Each columnar array 44 can include a number of nozzles 46, for example one for each of primary colors such as cyan (C), magenta (M), yellow (Y), and black (K). The nozzles 46 in each columnar array 44 can be co-linear or slightly offset along the X-axis for example, for example. The columnar arrays can be substantially parallel to a Y-axis which is orthogonal to the X-axis and in line or aligned with the rotation of the print drum 14. The ink drops deposited by each columnar array in a revolution of the print drum comprise a scan line. Each scan line can comprise drops from any of the nozzles that deposit a particular scan line. Each scan line is substantially parallel to the Y-axis.

Printing an image on the transfer surface 12 can be accomplished for example by rotating the print drum in a first direction (e.g., clockwise as viewed in FIG. 1), moving the applicator assembly into contact with the print drum to form the transfer surface, moving the applicator assembly away from the print drum after the transfer surface has been formed, depositing drops onto the transfer surface during a plurality of revolutions or passes of the print drum, and appropriately translationally moving the printhead along the X-axis. For example, the printhead can be moved in increments (one for each print drum revolution, for example). Also, the printhead can be moved at a constant slew speed while the print drum rotates. In this manner, an image printed on the transfer surface 12 over a plurality of revolutions of the print drum comprises a plurality of interlaced scan lines.

Figure 3:
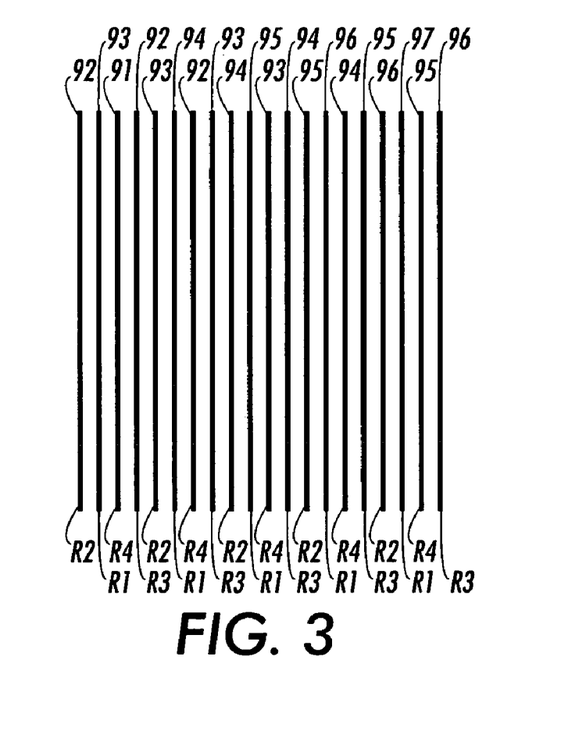
FIG. 3 is a simplified schematic illustration of an embodiment of interlaced scan lines.

FIG. 3 is a simplified schematic illustration of an embodiment of interlaced scan lines that can be produced using a printhead having nozzle columnar arrays that are spaced four scan lines apart along the X-axis, and wherein the printhead is advanced three scan lines along the X-axis after each print drum revolution. The scan line 91 represents a set of scan lines printed by a first nozzle, the scan lines 92 represent a second set of scan lines printed by a second nozzle, the scan lines 93 represent a third set of scan lines printed by a third nozzle, the scan lines 94 represent a fourth set of scan lines printed by a fourth nozzle, the scan lines 95 represent a fifth set of scan lines printed by a fifth nozzle, the scan lines 96 represent a sixth set of scan lines printed by a sixth nozzle, and the scan lines 97 represent a seventh set of scan lines printed by a seventh nozzle. The particular drum revolution during which a scan line is printed is indicated by R1 through R4. The number of sets of scan lines and the spacing between sets of scan lines can depend on the desired dot density along the X-axis (sometimes expressed as dots per inch) and the spacing between columnar arrays 44 of nozzles 46 (FIG. 2). In practice, an image can be formed using a greater number of print drum revolutions, for example six wherein the printhead is advanced six scan lines after each print drum revolution.

An image can also be printed in a single pass or revolution of the print drum, in which case the X-axis dot density would be defined by the spacing between the columnar arrays of nozzles.

The deposited image can further include a Y-axis density that is measured orthogonally to the X-axis, for example along the direction of rotation of the print drum. The Y-axis dot density can be visualized as being parallel to the Y-axis when the image is flattened to plane that is parallel to the X-axis and the Y-axis. The Y-axis dot density can be controlled by the rotation speed of the print drum and the drop timing of the printhead. In this manner, the deposited image has a two-dimensional dot density X by Y which can be expressed as X×Y.

After an entire image is deposited onto the transfer surface 12, the deposited image is transferred to the print media substrate by moving the transfer roller into contact with the transfer surface 12 and moving the print media substrate 21 into the nip formed between the transfer roller and the intermediate transfer surface 12. Continued rotation of the print drum 14 causes the print media substrate to pass through the nip, and a combination of pressure in the nip and heat causes the deposited image to transfer from the print drum and fuse to the print media substrate 21. The transfer roller 23 is moved away from the print drum 14 after the image has been transferred.

The printing apparatus of FIG. 1 can accomplish printing by printing dots whose locations are defined by a plurality of bit-maps, one for each primary color, for example.

Figure 4:
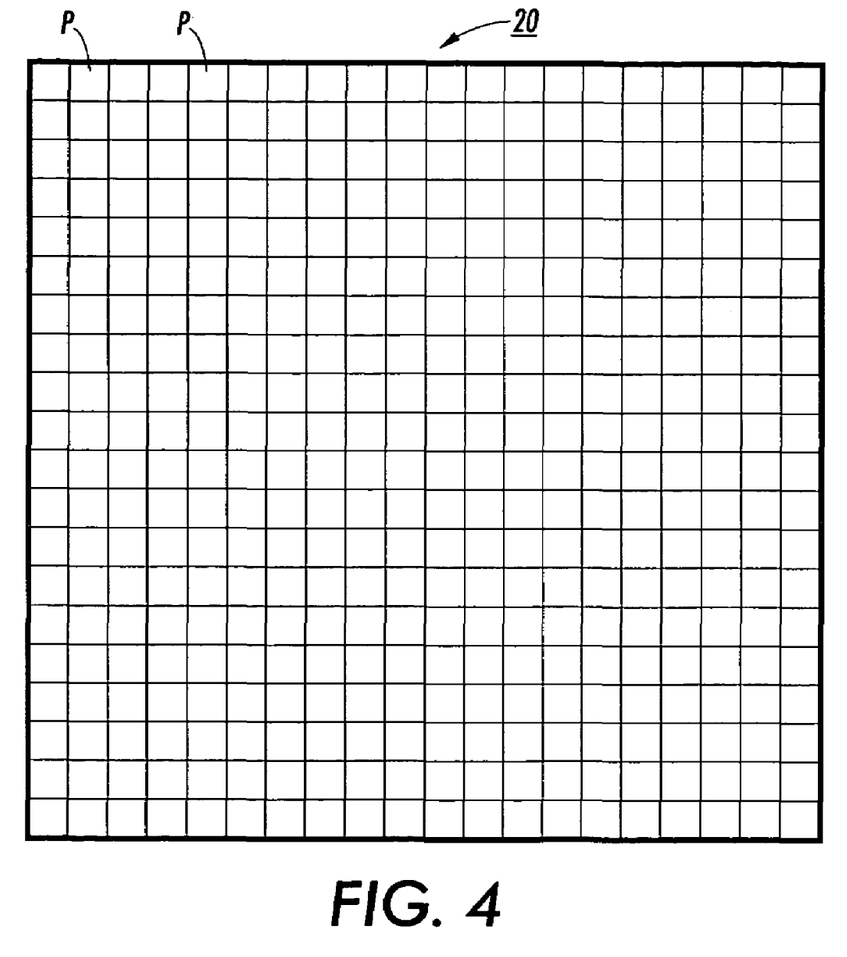
FIG. 4 is a schematic representation of a single color one bit per pixel bi-level bitmap.

FIG. 4 is a schematic representation of a one bit per pixel bi-level bitmap 20 that can be stored, for example, in a memory of the printing apparatus. The bitmap comprises a plurality of pixel locations P logically arranged in side by side linear arrays such as rows and columns that can for example correspond to a primary color pixel array that is printed by the printing apparatus. For the particular example of a bitmap logically arranged in rows and columns, each column of the pixel array can correspond to a scan line printed by a particular nozzle in a revolution of the print drum. Each pixel location of the bitmap comprises a data bit or pixel that indicates whether or not a corresponding output pixel location is marked with a dot of the relevant color. By way of illustrative example a 1 can indicate a dot, while a 0 can indicate no dot of the relevant color. In the context of a bitmap, it may be convenient to use the term pixel to refer to either a pixel location or a pixel bit. A pixel location, pixel data bit or pixel can be referred to as being "on", which indicates that a dot of the relevant color is to be printed, or "off" which indicates that no dot of the relevant color is to be printed. It may also be convenient to refer to a pixel location, pixel bit or pixel as being "marked" which indicates that a dot of the relevant color is to be printed, or "unmarked" which indicates that no dot of the relevant color is to be printed. In the context of storing or writing data to a pixel location, it may be convenient to refer to copying a pixel from one location to another, whereby the state of source pixel is copied to a destination location. Moving a pixel can be achieved by copying the pixel to a destination location and resetting the source pixel. In the context of moving a source marked pixel, the destination pixel location is marked and the source pixel is unmarked, for example concurrently or after the destination pixel location is marked.

The contents of the bi-level one bit per pixel bitmap can comprise for example the result of half-toning multi-bit per pixel data (e.g., continuous tone, gray-scale, luminance, darkness, intensity or multi-level pixel data) to bit-mapped raster data that contains one bit per pixel. Illustrating a half-toned one-bit per pixel bit-map in a grid pattern can aid in understanding that each bit is data for a particular location in a pixel array for a particular color.

While the disclosed techniques can generally be employed with a bitmap logically arranged in side by side linear arrays, for convenience and ease of understanding such techniques will be described primarily in the context of linear arrays comprising columns.

Figure 5:
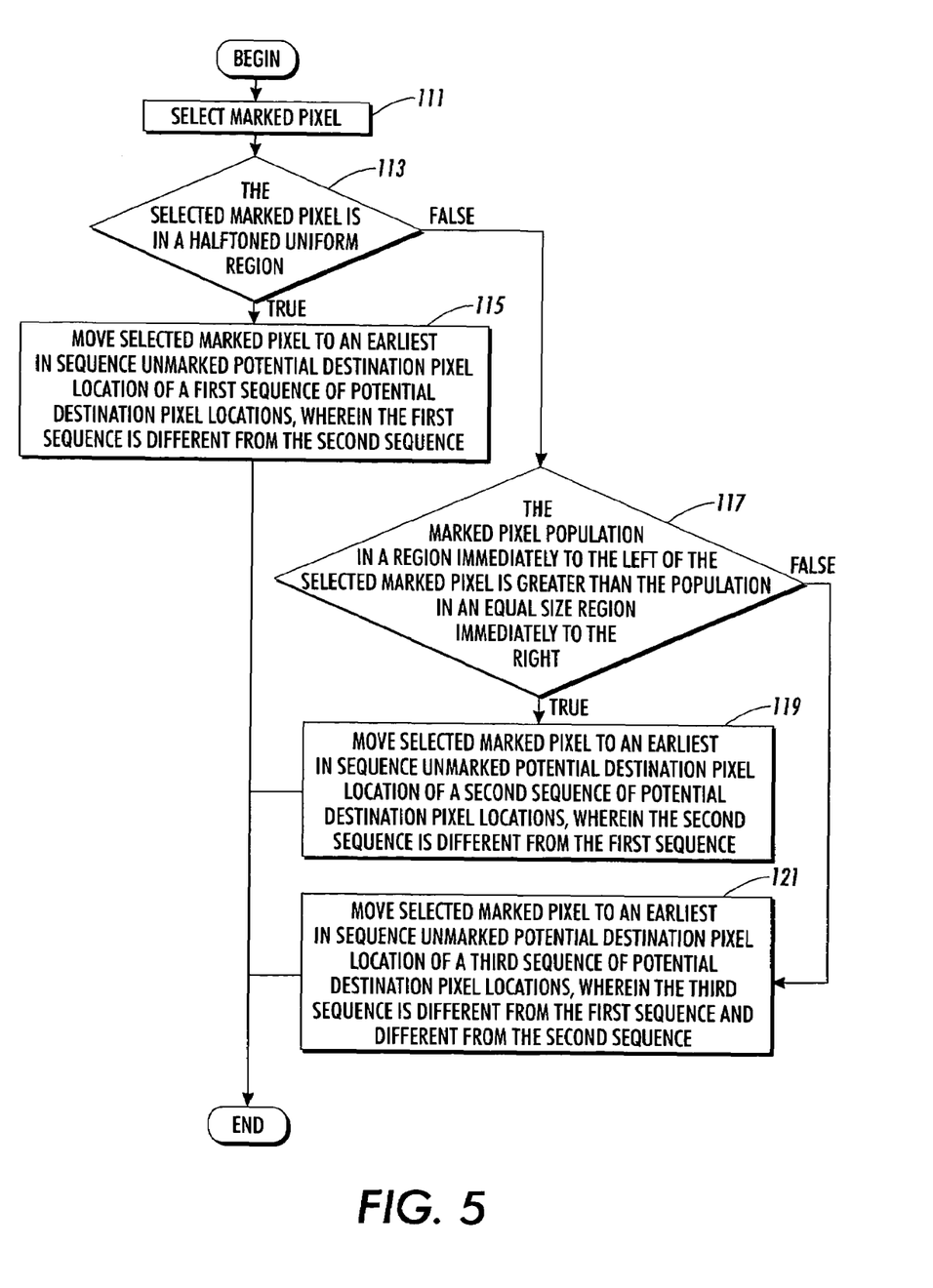
FIG. 5 is a schematic flow diagram of a procedure for modifying a one bit per pixel bi-level bitmap.

FIG. 5 is a schematic flow diagram of a procedure for modifying a one bit per pixel bi-level bitmap by copying or moving a marked or on pixel of the bitmap, for example wherein the drop generator tasked with printing a dot defined by such on pixel has been determined to be inoperative or has been disabled. A drop generator can be disabled, for example electrically or mechanically, where it has been determined to be intermittent or inoperative. In the disclosed implementation, an inoperative or disabled drop generator would result in a scan line that would not include dots of the color provided by the inoperative drop generator. Where a nozzle has been disabled, copying a source pixel to another pixel is like moving the source-pixel since the marked source pixel is effectively disregarded.

At 111 a marked pixel is selected as a source pixel, for example in a column associated with an inoperative nozzle. At 113 a determination is made as to whether the selected marked pixel is in a half-toned uniform region, for example wherein a half-toned uniform region comprises a region of the half-toned bit-map that represents or corresponds to a region of substantially uniform lightness or value in the pre-half-toned multi-bit per pixel data, for example.

If the determination at 113 is yes, at 115 the marked pixel is copied or moved to an earliest in sequence unmarked pixel location of a first sequence of potential destination pixel locations located in a vicinity of the source pixel. The procedure then ends.

If the determination at 113 is no, at 117 a determination is made as to whether a marked pixel population in a region immediately to the left of the selected marked pixel is greater than the marked pixel population in a region immediately to the right of the selected marked pixel.

If the determination at 117 is yes, at 119 the selected marked pixel is copied or moved to an earliest in sequence unmarked pixel location of a second sequence of potential destination pixel locations located in a vicinity of the source pixel, wherein the second sequence of potential destination pixel locations is different from the first sequence of potential destination pixel locations.

If at 117 is no, at 121 the selected marked pixel is copied or moved to an earliest in sequence unmarked pixel location of a third sequence of potential destination pixel locations located in a vicinity of the source pixel, wherein the third sequence of potential destination pixel locations is different from the first sequence of potential destination pixel locations, and also different from the second sequence of potential destination pixel locations.

The regions that are checked for marked population can be the same or different sizes, and each region can be about 3 pixels wide by about 8 pixels high, wherein width is measured along the row direction and height is measured along the column direction.

The number of potential destination pixel locations in each of the second and third sequences of potential destination pixel locations can be different from the number of potential destination pixel locations in the first sequence of potential destination pixel locations. The number of potential destination pixel locations in the third sequence of potential destination pixel locations can be different from the number of potential destination pixel locations in the second sequence of potential destination pixel locations. For example, the number of potential destination pixel locations in the second sequence of potential destination pixel locations can be less than the number of potential destination pixel locations in the first sequence of potential destination pixel locations, and/or the number of potential destination pixel locations in the third sequence of potential destination pixel locations can be less than the number of potential destination pixel locations in the first sequence of potential destination pixel locations. As another example, the pattern or layout of the first, second and third sequences can be different from one another. As yet another example, the second and third sequences of potential destination pixel locations can be mirror images, for example about the column containing the selected marked pixel.

Alternatively, only one sequence can be employed when the selected marked pixel is not in a uniform half-toned region, instead of two sequences.

Pursuant to the foregoing, a selected marked pixel is generally copied to an available neighboring pixel that is in a defined neighborhood vicinity of the source marked pixel. Optionally, if the source marked pixel is copied to an available neighboring pixel, the source marked pixel can be unmarked. The potential destination pixel locations can be dependent on whether the selected marked pixel is in a half-toned uniform region, and/or the marked pixel population density on either side of the selected marked pixel. Also, the sequence of nearby pixel locations considered can be determined by the previous history of copied pixels. For example, a sequence used for a particular selected marked pixel can be one that starts on a side opposite a destination pixel location to which a previous selected marked pixel was copied.

Figure 6:
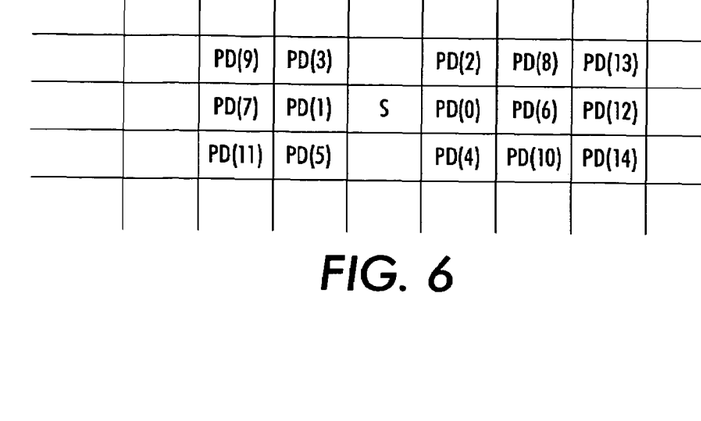
FIG. 6 is a schematic illustration of a sequence of potential destination pixel locations.

Referring now to FIG. 6, the first sequence of potential destination pixel locations, identified as PD(l), can include pixel locations in a plurality of contiguously adjacent columns on a first side of the column containing a selected marked pixel S and a plurality of contiguously adjacent columns on a second side of the column containing the selected marked pixel. The number of contiguously adjacent columns on one side can be different from the number of contiguously adjacent columns on the other side. By way of illustrative example, the first sequence of potential destination pixel locations can include pixel locations located only in three contiguously adjacent columns on each side of the column containing a selected marked pixel S. As another example, the first sequence of potential destination pixel locations can include pixel locations located only in two contiguously adjacent columns on each side of the column containing a selected marked pixel S.

As also illustrated in FIG. 6, the first sequence of potential destination pixel locations can also include pixel locations diagonally adjacent the selected marked pixel S, including for example a diagonally adjacent pixel location in each diagonal direction.

Figure 7:
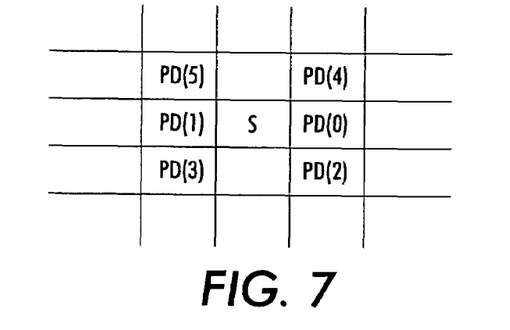
FIG. 7 is a schematic illustration of another sequence of potential destination pixel locations.

Referring now to FIG. 7 the second sequence of potential destination pixel locations, identified as PD(l), can include pixel locations in one column on a first side of the column containing a selected marked pixel S and one column on a second side of the column containing the selected marked pixel. For example, the second sequence of potential destination pixel locations can include pixel locations only in one column on each side of the column containing a selected marked pixel S. By way of specific example, the first potential destination pixel location of the second sequence can be on the left side of the column containing the selected marked pixel.

The number of potential destination pixels on one side of the column containing the selected marked pixel can be different from the number of potential destination pixels on the other side of the column containing the selected marked pixel.

As also illustrated in FIG. 7, the second sequence of potential destination pixel locations can also include pixel locations diagonally adjacent the selected marked pixel S, including for example a diagonally adjacent pixel location in each diagonal direction.

Figure 8:
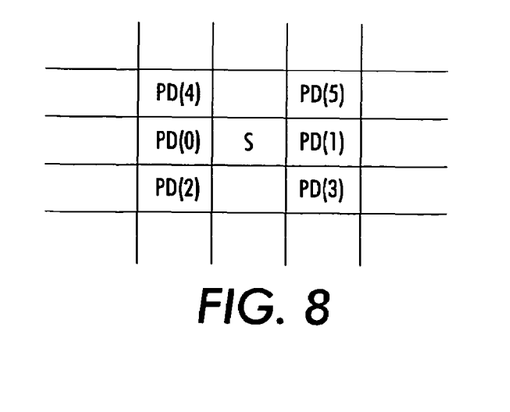
FIG. 8 is a schematic illustration of a further sequence of potential destination pixel locations.

Referring now to FIG. 8 the second sequence of potential destination pixel locations, identified as PD(l), can include pixel locations in one column on a first side of the column containing a selected marked pixel S and one column on a second side of the column containing the selected marked pixel. For example, the second sequence of potential destination pixel locations can include pixel locations only in one column on each side of the column containing a selected marked pixel S.

By way of specific example, the first potential destination pixel location of the third sequence can be on the right side of the column containing the selected marked pixel.

From FIGS. 7 and 8 it can be seen that as to a selected marked pixel that is not in a half-tone uniform region, the particular sequence employed can start on the side of the selected marked pixel that has a higher population density. Sequences such as shown in FIGS. 7 and 8 can be used in a varying manner in halftone uniform regions so that the starting side is varied. For example, two sequences may be alternated by the final destination of the previously moved pixel. If the previously moved pixel was moved to the right then the sequence used for the next marked pixel would be the one shown in FIG. 7 since the first location in that sequence is to the left. The sequence in FIG. 8 would be used if the previous marked pixel was moved to the left. Alternatively, other methods could be used to determine how sequences are alternated. The alternation could be made from one marked pixel to another or based strictly on the pixel location of the marked pixel, or some other parameter. Two sequences may also be alternated in a random manner. It is also possible to use more than two sequences.

The number of potential destination pixels on one side of the column containing the selected marked pixel can be different from the number of potential destination pixels on the other side of the column containing the selected marked pixel.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of modifying a single color bi level bit map including a plurality of pixel locations arranged in side by side linear arrays, each pixel containing a pixel bit, comprising:

selecting a marked pixel that is to be printed by malfunctioning drop generator;

determining whether the selected marked pixel is in a half-toned uniform region;

if the selected marked pixel is in a half-toned uniform region that corresponds to a region of substantially uniform lightness or value in a pre-half-toned multi-bit per pixel data, marking a first unmarked pixel of a first sequence of potential destination pixel locations;

if the selected marked pixel is not in a half-toned uniform region that corresponds to a region of substantially uniform lightness or value in a pre-half-toned multi-bit per pixel data, marking a first unmarked pixel of a second sequence of potential destination pixel locations;

wherein the second sequence of potential destination pixel locations is different from the first sequence of potential destination pixel locations.

2. The method of claim 1 further including unmarking the selected marked pixel if an unmarked potential destination pixel is marked.

3. The method of claim 1 wherein the number of potential destination pixel locations in the second sequence of potential destination pixel locations is less than the number of potential destination pixel locations in the first sequence of potential destination pixel locations.

4. The method of claim 1 wherein the second sequence of potential destination pixel locations are arranged in a pattern that is different from a pattern in which the first sequence of potential destination pixel locations are arranged.

5. The method of claim 4 wherein the second sequence of potential destination pixel locations includes potential destination pixel locations located only in (a) one linear array on a first side of the linear array containing the selected marked pixel and (b) one linear array on a second side of the linear array containing the selected marked pixel.

6. The method of claim 1 wherein the first sequence includes potential destination pixel locations located in (a) a first plurality of contiguously adjacent linear arrays located on a first side of a linear array that contains the selected marked pixel and (b) a second plurality of contiguously adjacent linear arrays located on a second side of the linear array that contains the selected marked pixel.

7. The method of claim 1 wherein:
the first sequence includes potential destination pixel locations located only in (a) two contiguously adjacent linear arrays located on a first side of a linear array that contains the selected marked pixel and (b) two contiguously adjacent linear arrays located on a second side of the lineary array that contains the selected marked pixel; and
the second sequence of potential destination pixel locations includes potential destination pixel locations located only in (a) one linear array on a first side of the linear array containing the selected marked pixel and (b) one linear array on a second side of the linear array containing the selected marked pixel.

8. The method of claim 1 wherein the first sequence of potential destination pixel locations includes potential pixel locations located diagonally adjacent the selected marked pixel.

9. The method of claim 1 wherein the second sequence of potential destination pixel locations includes potential pixel locations located diagonally adjacent the selected marked pixel.

10. A method of modifying a single color bi level bit map including a plurality of pixel locations arranged in side by side linear arrays, each pixel containing a pixel bit comprising:
selecting a marked pixel that is to be printed by a malfunctioning drop generator;
determining whether the selected marked pixel is in a half-toned uniform region that corresponds to a region of substantially uniform lightness or value in a pre-half-toned multi-bit per pixel data, marking a first unmarked pixel of a first sequence of potential destination pixel locations;
if the selected marked pixel is in a half-toned uniform region that corresponds to a region of substantially uniform lightness or value in a pre-half-toned multi-bit per pixel data, marking a first unmarked pixel of a first sequence of potential destination pixel locations, marking a first unmarked pixel of a first sequence of potential destination pixel locations;
if the selected marked pixel is not in a half-toned uniform region that corresponds to a region of substantially uniform lightness or value in a pre-half-toned multi-bit per pixel data, marking a first unmarked pixel of a first sequence of potential destination pixel locations, marking a first unmarked pixel of a second sequence of potential destination pixel locations or a third sequence of potential destination pixel locations, depending on marked pixel populations on either side of a linear array that contains the selected marked pixel;
wherein the number of potential destination pixel locations in each of the first and second sequences of potential destination pixel locations is less than the number of potential destination pixel locations in the first sequence of potential destination pixel locations.

11. The method of claim 10 further including unmarking the selected marked pixel if an unmarked potential destination pixel is marked.

12. The method of claim 10 wherein the first sequence includes potential destination pixel locations located in (a) a first plurality of contiguously adjacent linear arrays located on a first side of a linear array that contains the selected marked pixel and (b) a second plurality of contiguously adjacent linear arrays located on a second side of the linear array that contains the selected marked pixel.

13. The method of claim 10 wherein the first sequence of potential destination pixel locations includes potential pixel locations located diagonally adjacent the selected marked pixel.

14. The method of claim 10 wherein each of the second and third sequences of potential destination pixel locations includes potential pixel locations located diagonally adjacent the selected marked pixel.

15. The method of claim 10 wherein the second and third sequences of potential destination pixel locations have the same number of potential destination pixel locations.

16. The method of claim 10 wherein the second and third sequences of potential destination pixel locations are mirror images of each other.

17. A method for modifying an image representing drops to be printed at pixel locations comprising:
determining a pixel location to be printed by a malfunctioning ejector;
determining if a drop is to be printed at that first pixel location;
searching nearby pixel locations for a second pixel location that is not printed by the malfunctioning ejector and is not printing a drop; and
if the search is successful, printing a drop at the second pixel location.

18. The method of claim 17 wherein the second pixel location is an adjacent neighbor of the first pixel location.

19. The method of claim 17 wherein the nearby pixel locations considered comprise a sequence of pixel locations that is determined by a pattern of drops to be printed in a vicinity of the first pixel location.

20. The method of claim 17 wherein the nearby pixel locations considered comprise a sequence of nearby pixel locations that is determined by the previous history of second pixel locations.

21. The method of claim 20 wherein the sequence of nearby pixel locations starts with the opposite side from a previous second pixel location.

22. The method of claim 17 wherein the first pixel location is set to no drops to be printed.

23. The method of claim 17 wherein no nearby second pixel is located.

24. The method of claim 17 wherein the malfunctioning ejector is disabled.

25. A method of modifying an image bit map including a plurality of pixel locations arranged in side by side linear arrays, comprising:
   selecting a marked pixel that is to be printed by a malfunctioning drop generator; and
   copying the selected marked pixel to an unmarked neighboring pixel that is not located in a linear array that contains the selected marked pixel.

26. The method of claim 25 wherein the selected marked pixel is unmarked.

27. A computer readable medium containing instructions that, when executed by a computer, cause the computer to perform a method for modifying a single color bi level bit map including a plurality of pixel locations arranged in side by side linear arrays, each pixel containing a pixel bit, the method comprising:
   selecting a marked pixel that is to be printed by a malfunctioning drop generator;
   determining whether the selected marked pixel is in a half-toned uniform region;
   if the selected marked pixel is in a half-toned uniform region that corresponds to a region of substantially uniform lightness or value in a pre-half-toned multi-bit per pixel data, marking a first unmarked pixel of a first sequence of potential destination pixel locations;
   if the selected marked pixel is not in a half-toned uniform region that corresponds to a region of substantially uniform lightness or value in a pre-half-toned multi-bit per pixel data, marking a first unmarked pixel of a second sequence of potential destination pixel locations;
   wherein the second sequence of potential destination pixel locations is different from the first sequence of potential destination pixel locations.

* * * * *